United States Patent
von Gynz-Rekowski et al.

(10) Patent No.: US 10,844,662 B2
(45) Date of Patent: Nov. 24, 2020

(54) MUD-LUBRICATED BEARING ASSEMBLY WITH LOWER SEAL

(71) Applicant: Rival Downhole Tools LC, Houston, TX (US)

(72) Inventors: Gunther H H von Gynz-Rekowski, Montgomery, TX (US); William Christian Herben, Magnolia, TX (US); Noah Elaia Crawford Daoust, Richmond, TX (US)

(73) Assignee: RIVAL DOWNHOLE TOOLS LC, Houston, TX (US)

( * ) Notice: Subject to any disclaimer, the term of this patent is extended or adjusted under 35 U.S.C. 154(b) by 153 days.

(21) Appl. No.: 16/182,796

(22) Filed: Nov. 7, 2018

(65) Prior Publication Data

US 2020/0141186 A1 May 7, 2020

(51) Int. Cl.
  *E21B 4/00* (2006.01)
  *F16C 19/54* (2006.01)
  *E21B 4/02* (2006.01)

(52) U.S. Cl.
  CPC ............... *E21B 4/003* (2013.01); *E21B 4/02* (2013.01); *F16C 19/545* (2013.01); *F16C 2352/00* (2013.01)

(58) Field of Classification Search
  CPC ........................................... E21B 4/003
  See application file for complete search history.

(56) References Cited

U.S. PATENT DOCUMENTS

| 4,361,194 A | 11/1982 | Chow et al. |
| 4,683,964 A | 8/1987 | Wenzel |
| 5,377,771 A * | 1/1995 | Wenzel ............ E21B 4/003 175/107 |
| 6,158,533 A | 12/2000 | Gillis et al. |
| 6,250,806 B1 | 6/2001 | Beshoory |
| 6,416,225 B1 * | 7/2002 | Cioceanu ............ E21B 4/003 384/97 |
| 8,511,906 B2 | 8/2013 | Marchand |
| 8,827,562 B2 | 9/2014 | Marchand et al. |
| 9,163,457 B2 | 10/2015 | Marchand |
| 2012/0177308 A1 | 7/2012 | Marchand |

(Continued)

OTHER PUBLICATIONS

International Search Report and Written Opinion dated Jan. 21, 2020, from Applicant's counterpart International Patent Application No. PCT/US2019/57691.

*Primary Examiner* — Giovanna Wright

(74) *Attorney, Agent, or Firm* — Jones Walker LLP

(57) ABSTRACT

A mud-lubricated bearing section including a seal assembly for directing a fluid flowing through a mud-lubricated bearing into a central bore of a mandrel. At least one mud-lubricated bearing is positioned in an annular space between the mandrel and a housing. The seal assembly directs the fluid from the annular space through a mandrel fluid port into the mandrel central bore. The seal assembly seals the annular space, and includes a piston, a plug, and a chamber between the piston and the plug. The piston is configured for axial movement relative to the mandrel and the housing, while the plug is axially fixed relative to the mandrel and/or the housing. The chamber is configured to contain a lubricating fluid. The piston includes inner and outer seals. The plug includes a lower seal and a passage allowing the fluid from the chamber to reach the lower seal for lubrication.

20 Claims, 6 Drawing Sheets

(56) References Cited

U.S. PATENT DOCUMENTS

2012/0195542 A1    8/2012    Marchand
2014/0037232 A1    2/2014    Marchand et al.
2016/0312534 A1*  10/2016   Ficken .................... E21B 7/068
2018/0066513 A1    3/2018    Sugiura et al.

* cited by examiner

MUD-LUBRICATED BEARING ASSEMBLY WITH LOWER SEAL

BACKGROUND

In the drilling of oil and gas wells, downhole drilling motors may be connected to a drill string to rotate and steer a drill bit or a rotary steerable system for directional drilling. Conventional drilling motors typically include a top sub, a power section, a transmission assembly, and a bearing assembly. Rotation is provided by the power section. The transmission assembly transmits torque and speed from the power section to a drill bit (or rotary steerable system) disposed at a lower end of the drilling motor. The bearing assembly takes up the axial and radial loads imparted on the drill string and the drill bit (or rotary steerable system) during drilling.

Conventional bearing assemblies include a mandrel positioned partially within a housing and one or more bearings disposed between the mandrel and the housing. The bearings are typically radial bearings or thrust bearings. The lower end of the mandrel is configured to engage a drill bit or a rotary steerable system. Conventional bearing assemblies are either sealed or mud-lubricated. In sealed bearing assemblies, the annular space between the mandrel and surrounding housing is sealed and filled with oil to prevent drill cuttings or other solids from contacting the bearings. In mud-lubricated bearing assemblies, the annular space between the mandrel and surrounding housing is not sealed, which allows a portion of the drilling fluid flowing to the drill bit to be diverted and flow through each of the bearings for lubrication and cooling of the bearings. The portion of the drilling fluid flowing through the bearings is typically discharged from the housing of the bearing assembly into the wellbore annulus.

DETAILED DESCRIPTION OF THE PREFERRED EMBODIMENTS

Figure 1:
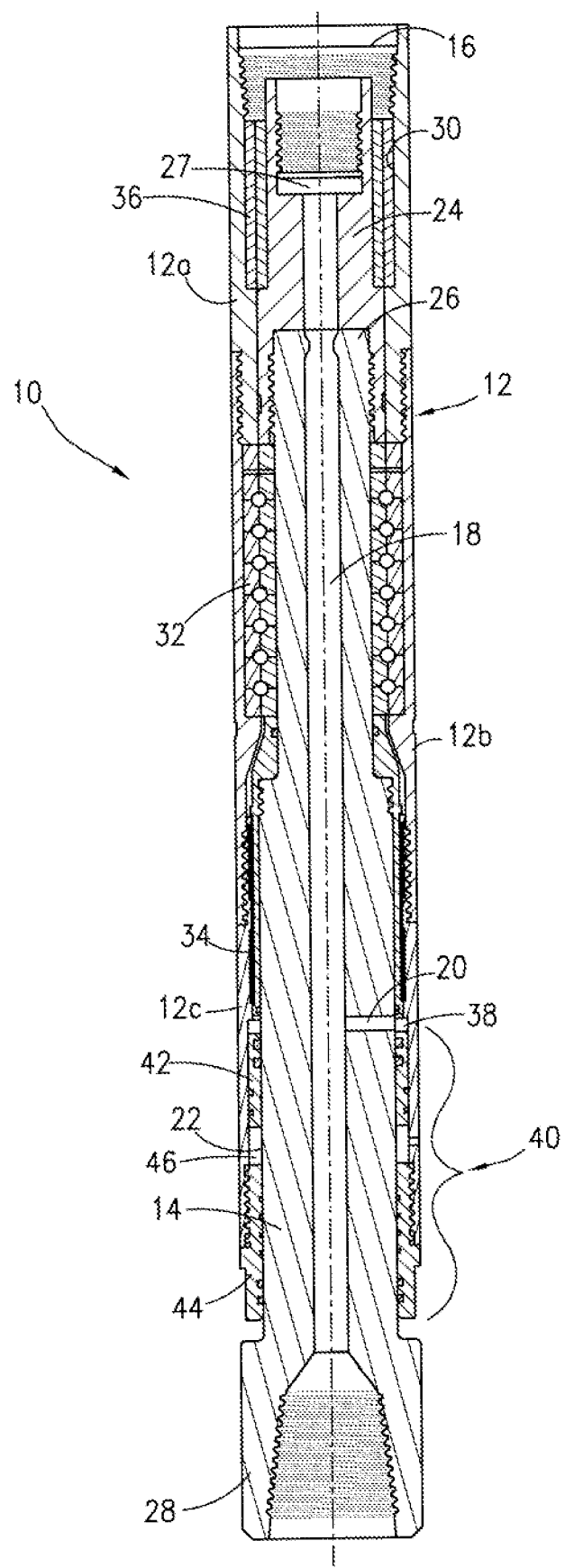
FIG. 1 is a cross-sectional view of a mud-lubricated bearing section.

A mud-lubricated bearing section includes a housing and a mandrel partially disposed within a central bore of the housing. At least one mud-lubricated bearing is positioned in an annular space between the mandrel and the housing. A seal assembly directs a first fluid (e.g., a drilling fluid or drilling mud) flowing through the mud-lubricated bearing to a central bore of the mandrel through a mandrel fluid port, which extends from an outer surface to the central bore of the mandrel. The seal assembly is at least partially disposed in and seals the annular space between the mandrel and the housing. The seal assembly is separated from the mud-lubricated bearing by an intermediate annular space, which is generally aligned with the mandrel fluid port. The seal assembly includes a piston, a plug, and a chamber between the piston and the plug. The piston is configured for axial movement relative to the mandrel and the housing, while the plug is axially fixed relative to the housing and/or the mandrel. The piston includes an inner seal engaging the mandrel and an outer seal engaging the housing. The plug includes a lower seal engaging the mandrel. The chamber is configured to contain a second fluid such as a grease, an oil, or any other lubricant. In one embodiment, the lower seal is disposed in an inner groove of the plug, and the plug includes a passage fluidly connecting the chamber to the lower seal. In this embodiment, a small volume of the second fluid in the chamber is forced through the passage to the lower seal for lubrication.

The mud-lubricated bearing section with the lower seal assembly allows drilling fluid flow through a mud-lubricated bearing with the drilling fluid returned to the mandrel central bore. The lower seal assembly is configured to prevent the drilling fluid from reaching the lower seal in the plug by allowing the piston to slide axially relative to the housing in response to a pressure differential between the drilling fluid pressure in the intermediate annular space above the piston and a fluid pressure outside of the housing. Because the piston is configured to slide axially, the pressure above the piston (i.e., the drilling fluid pressure in the intermediate annular space) and the pressure below the piston (e.g., the second fluid pressure in the chamber) remain equal. The drilling fluid does not cross the inner seal or outer seal of the piston (i.e., the drilling fluid does not enter the chamber). The second fluid in the chamber is used to lubricate the lower seal of the plug. Because the second fluid pressure in the chamber above the lower seal is greater than the fluid pressure outside of the housing, the fluid outside of the housing does not cross the lower seal into the chamber.

A mud-lubricated bearing assembly for a drilling motor may also contain an adapter disposed within the housing central bore. An upper end of the adapter is configured for connection to a lower end of a transmission shaft of the drilling motor. The mandrel is secured to the lower end of the adapter.

With reference to FIG. 1, mud-lubricated bearing assembly 10 includes housing 12 and mandrel 14, which is partially disposed within housing central bore 16. Housing 12 may be formed of threadedly-connected housing sections 12a, 12b, and 12c. Mandrel 14 includes mandrel central bore 18 and mandrel fluid port 20 extending from mandrel central bore 18 to mandrel outer surface 22. Adapter 24 may be secured to upper end 26 of mandrel 14 within housing central bore 16. Adapter 24 includes adapter central bore 27. An upper end of adapter 24 may be configured for connection to a lower end of a transmission shaft in a drilling motor. Lower end 28 of mandrel 14 may be configured for connection to a drill bit or rotary steerable system in a drilling motor.

Mandrel fluid port 20 may extend between mandrel outer surface 22 and mandrel central bore 18 in any configuration, such as in a lateral direction (as illustrated) or in a sloped direction. In one alternate embodiment, mandrel 14 may include two or more mandrel fluid ports 20 providing a fluid connection to mandrel central bore 18 from the annular space between mandrel 14 and housing 12.

At least one mud-lubricated bearing is disposed in the annular space between mandrel outer surface 22 and housing inner surface 30. In one embodiment, bearing assembly 10 includes thrust bearing 32 and radial bearing 34 disposed in the annular space between mandrel outer surface 22 and housing inner surface 30. Bearing assembly 10 may also include upper radial bearing 36 disposed in an annular space between adapter 24 and housing inner surface 30. Alternatively, upper radial bearing 36 may be disposed in the annular space between mandrel outer surface 22 and housing inner surface 30 such that this annular space contains an upper radial bearing, a thrust bearing, and a lower radial bearing. The at least one mud-lubricated bearing comprises any combination of thrust bearings and/or radial bearings in the annular space between mandrel outer surface 22 (or adapter 24) and housing inner surface 30.

With reference again to FIG. 1, bearing assembly 10 also includes a seal assembly for sealing the annular space between mandrel outer surface 22 and housing inner surface 30 near mandrel fluid port 20. Specifically, the seal assembly is separated from the one or more mud-lubricated bearings by intermediate annular space 38. Intermediate annular space 38 is disposed below the one or more mud-lubricated bearings, between housing inner surface 30 and mandrel outer surface 22, and the seal assembly defines the lower end of intermediate annular space 38. In other words, an outer surface of intermediate annular space 38 is defined by housing inner surface 30, an inner surface of intermediate annular space 38 is defined by mandrel outer surface 22, and a lower surface of intermediate annular space 38 is defined by the seal assembly. The upper surface of intermediate annular space 38 may be defined by an inner sleeve configured to contain one of the bearings, such as bearing 34 as illustrated. Alternatively, the upper surface of intermediate annular space 38 may be defined by a bearing itself. Mandrel fluid port 20 is generally aligned with intermediate annular space 38. In other words, the inner surface of intermediate annular space 38 contains an inlet to mandrel fluid port 20.

In the illustrated embodiment, seal assembly 40 includes piston 42, plug 44, and chamber 46 between piston 42 and plug 44. In this embodiment, an upper end of piston 42 defines the lower surface of intermediate annular space 38.

Figure 2:
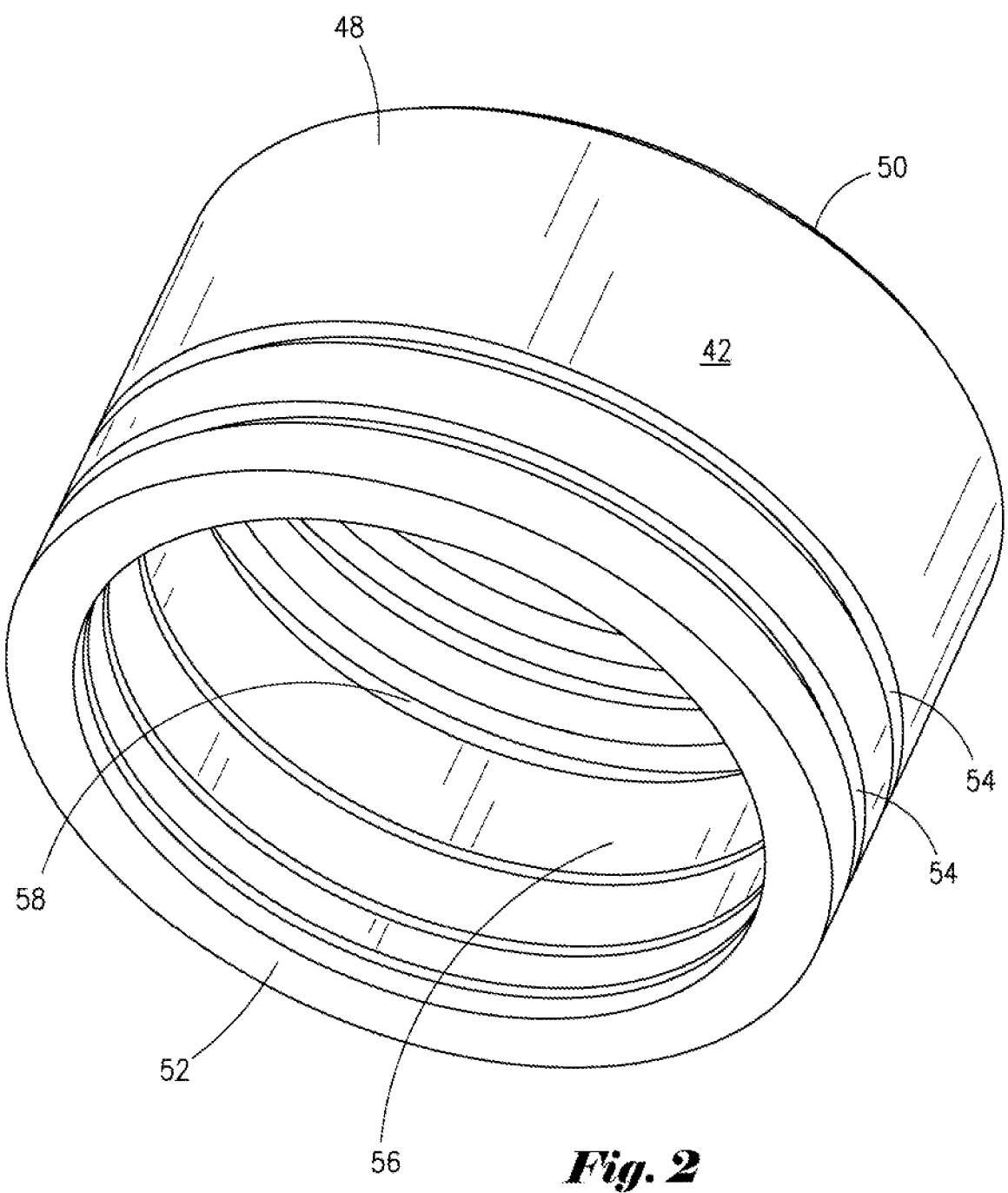
FIG. 2 is a perspective view of a piston of the bearing section.

As shown in FIG. 2, piston 42 may have a generally cylindrical shape. Outer surface 48 of piston 42 extends from first end 50 to second end 52. Outer surface 48 includes one or more outer grooves 54. Inner surface 56 of piston 42 includes one or more inner grooves 58.

Figure 3:
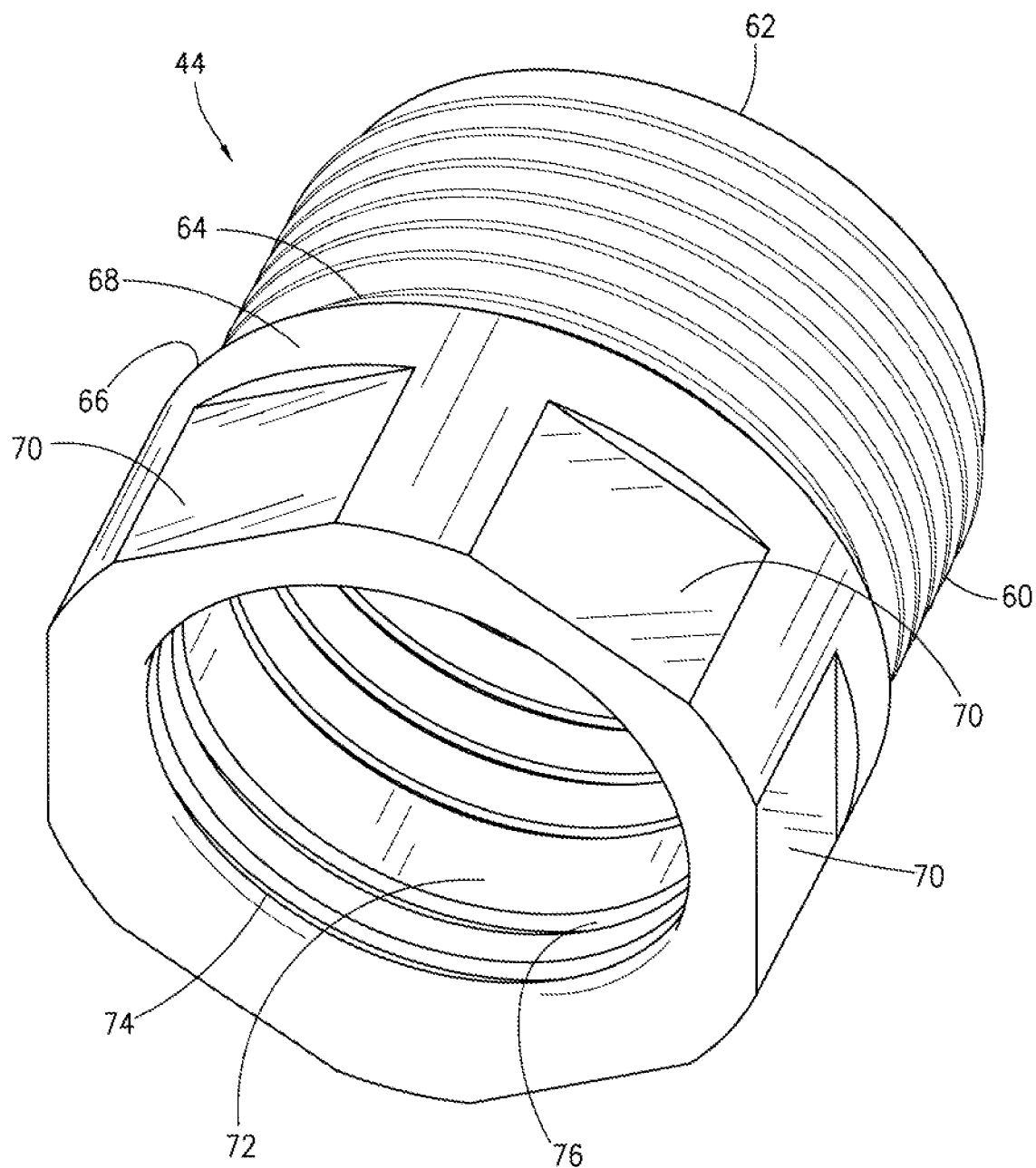
FIG. 3 is a perspective view of a plug of the bearing section.

FIG. 3 illustrates plug 44, which may also have a generally cylindrical shape. Plug 44 may include threaded outer surface 60 extending from first end 62 to outer groove 64. Outer groove 64 may be adjacent to shoulder 66, which leads to expanded diameter outer surface 68. Expanded diameter outer surface 68 may include a plurality of inset surfaces 70 providing grip surfaces for threadedly securing plug 44 to housing 12. Inner surface 72 of plug 44 may include one or more inner grooves 74 and a passage 76.

Figure 4:
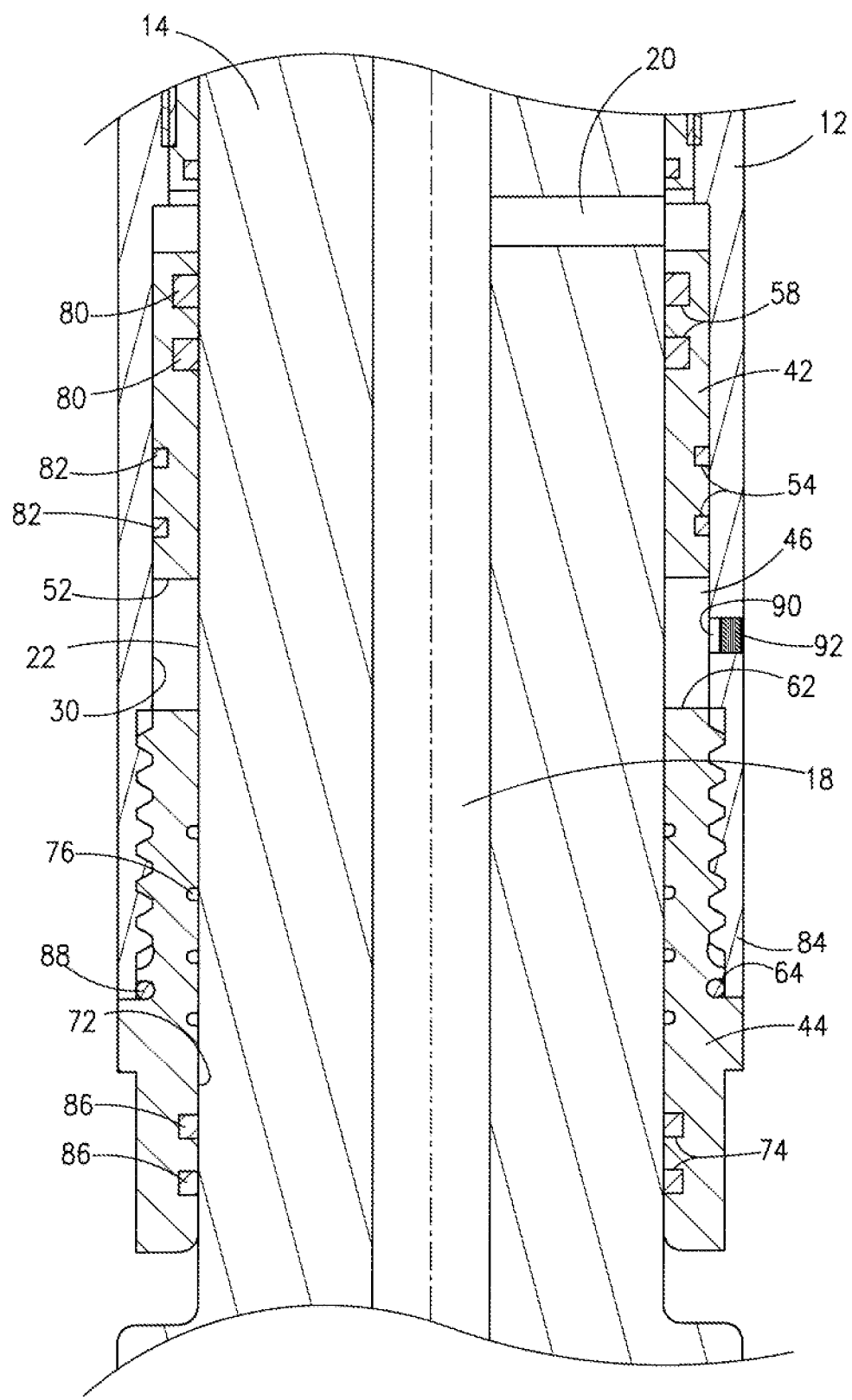
FIG. 4 is a partial cross-sectional view of the bearing section.

Referring now to FIG. 4, piston 42 is configured for axial movement relative to mandrel 14 and housing 12. Specifically, piston 42 is slidingly disposed in the annular space between mandrel outer surface 22 and housing inner surface 30 below mandrel fluid port 20. Piston 42 may also include one or more inner piston seals 80 each disposed in one of the inner grooves 58 and one or more outer piston seals 82 each disposed in one of the outer grooves 54. Each inner piston seal 80 engages mandrel outer surface 22, and each outer piston seal 82 engages housing inner surface 30. Inner piston seals 80 may be formed of rotary seals, and outer piston seals 82 may be formed of axial seals.

Plug 44 is axially fixed relative to mandrel 14 and/or housing 12. In the embodiment illustrated, plug 44 is threadedly connected to lower end 84 of housing 12. Plug 44 may include one or more lower seals 86 each disposed in one of the inner grooves 74. Each lower seal 86 engages mandrel outer surface 22. Passage 76 of plug 44 fluidly connects chamber 46 to lower seals 86. Passage 76 may be formed of any structure configured to provide a low volume of fluid flow (e.g., a fluid leak) between chamber 46 and lower seals 86. In the embodiment illustrated in FIG. 4, passage 76 is formed of a spiral groove in inner surface 72 of plug 44. Plug 44 may also include outer seal 88 disposed in outer groove 64. Outer seal 88 may engage housing inner surface 30. Lower seals 86 may be formed of rotary seals, and outer seal 88 may be formed of stationary seals. In one embodiment, lower seals 86 are formed of seals that allow leakage for lubrication of the seal, such as those commercially available from Kalsi Engineering under the name Kalsi Seals.

Chamber 46 is a space defined by second end 52 of piston 42, first end 62 of plug 44, housing inner surface 30, and mandrel outer surface 22. Housing 12 may include housing fluid port 90 extending through housing 12 to provide an inlet for filling chamber 46 with a fluid. Port seal 92 may be secured within housing fluid port 90 to selectively seal housing fluid port 90. Port seal 92 may engage housing fluid port 90 in any manner capable of providing a detachable connection, such as a threaded connection.

Figure 5:
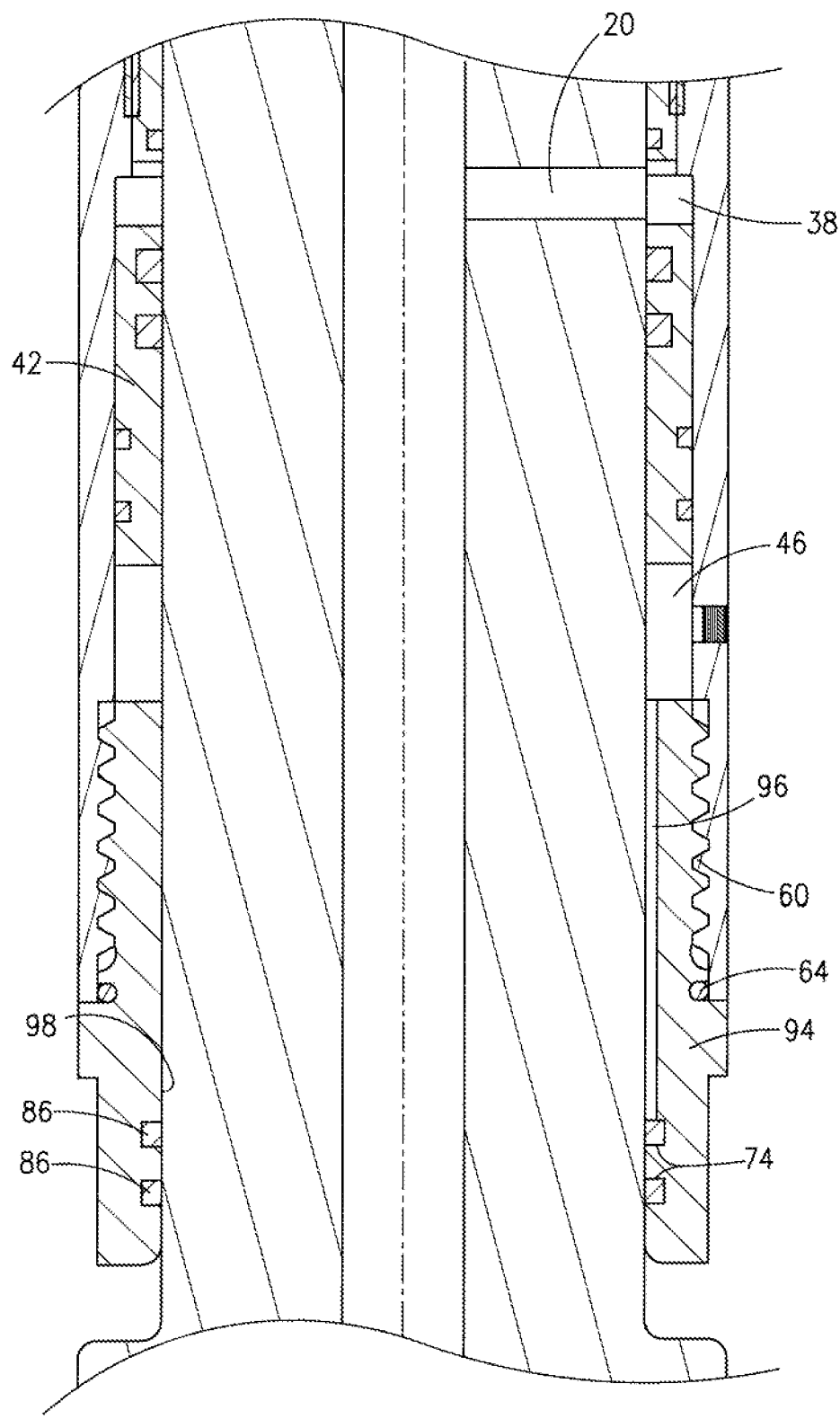
FIG. 5 is a partial cross-sectional view of an alternate embodiment of the bearing section.

FIG. 5 illustrates an alternate embodiment of the plug with the same reference numerals used for the same structures illustrated in FIGS. 1-4 and described above. Plug 94 includes passage 96, which is formed of a longitudinal groove in inner surface 98 of plug 94. Passage 96 fluidly connects chamber 46 to lower seals 86, which are positioned in inner grooves 74.

Figure 6:
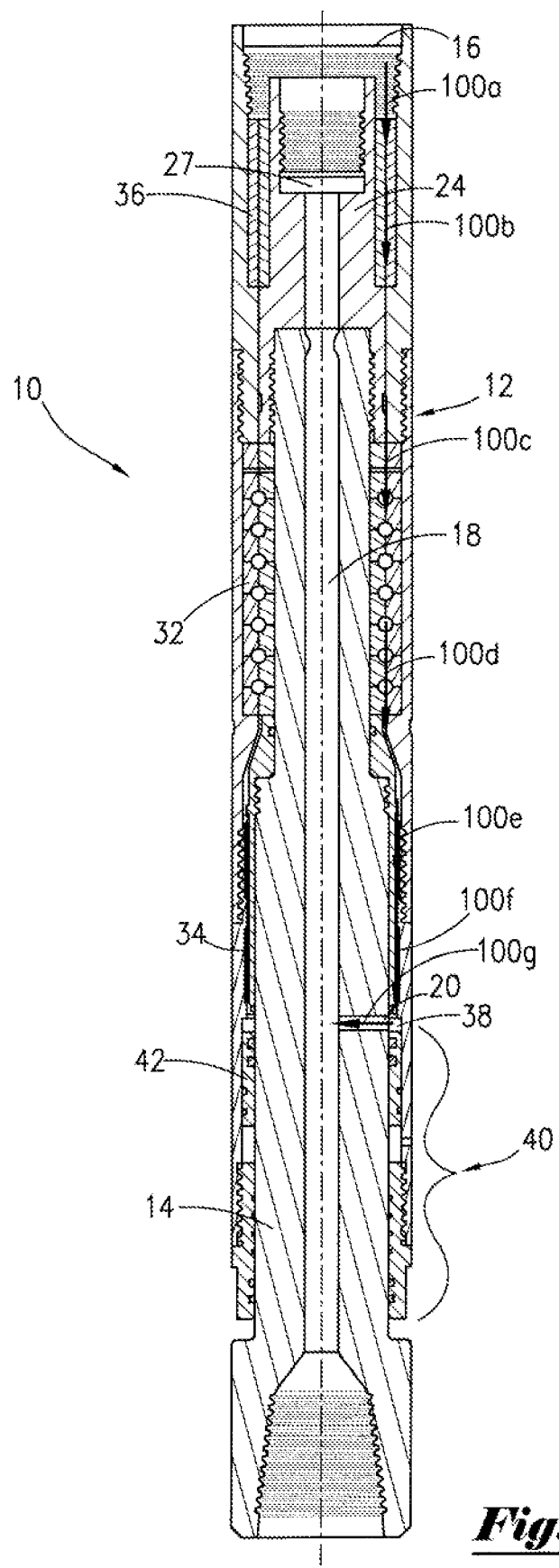
FIG. 6 is a cross-sectional view of the bearing section illustrating a flow path.

With reference to FIG. 6, bearing assembly 10 is configured to be attached below a transmission section as part of a drilling motor. A transmission shaft of the transmission section causes adapter 24 and mandrel 14 to rotate relative to housing 12. A first fluid flowing through the transmission section enters housing central bore 16. The first fluid may be a drilling fluid or drilling mud. Most of the first fluid enters adapter central bore 27 and flows through mandrel central bore 18. Bearing assembly 10 is designed to divert a portion of the first fluid to the bearings, which are described as "mud-lubricated" since the first fluid flows through the bearing to lubricate and cool the components within each bearing. Because the annular space between adapter 24 and housing 12 does not contain a seal, a portion of a first fluid flowing through housing central bore 16 flows through flow path 100 illustrated with arrows 100a-100g in FIG. 6. As illustrated, flow path 100 extends through an annular space between adapter 24 and housing 12, through upper radial bearing 36, through thrust bearing 32, through radial bearing 34, through intermediate annular space 38, through mandrel fluid port 20, and into mandrel central bore 18.

Seal assembly 40 including piston 42 prevents the first fluid from leaving the housing 12 at its lower end. Seal assembly 40 directs the diverted first fluid in intermediate annular space 38 through mandrel fluid port 20 and into mandrel central bore 18 where the diverted portion of the first fluid is returned to the remainder of the first fluid. In other words, seal assembly 40 provides for use of only mud-lubricated bearing(s) without the loss of the first fluid.

Referring now to FIG. 4, chamber 46 may be filled with a second fluid through housing fluid port 90, which is then sealed with port seal 92. The second fluid may be any lubricant such as an oil or a grease. Inner piston seals 80 and outer piston seals 82 prevent the first fluid in intermediate annular space 38 above piston 42 from entering chamber 46. Inner piston seals 80 and outer piston seals 82 also prevent the second fluid in chamber 46 from flowing around piston 42 into intermediate annular space 38 above piston 42.

Because piston 42 is configured for axial movement relative to housing 12 and mandrel 14, the pressure of the first fluid in intermediate annular space 38 above piston 42, which is labeled $P_1$, is equal to the pressure of the second fluid in chamber 46, which is also labeled $P_1$. Piston 42 can slide downward in response to a force applied by an increased fluid pressure in intermediate annular space 38 above, thereby maintaining equal fluid pressures on either side of piston 42. When piston 42 slides downward, the volume of chamber 46 decreases because plug 44 is axially fixed. The pressure of an external fluid flowing around the outside surface of housing 12 in an annulus of a wellbore, which is labeled $P_2$, is lower than P1 in chamber 46 (and in intermediate annular space 38). This fluid pressure differential across plug 44 causes an amount of the second fluid in chamber 46 to flow through passage 76 to lubricate lower seals 86 in plug 44. Accordingly, there is a fluid pressure differential across plug 44, but no fluid pressure differential across piston 42.

Typical causes of seal failure include differential pressures applied across the seal, abrasive materials in a fluid contacting the seal, and use of the seal in a high temperature application without lubrication. Seal assembly 40 in bearing assembly 10 prevents each of these causes of seal failure. The first fluid in intermediate annular space 38 may contain drill cuttings or other solids. Because the fluid pressure is equal on both sides of piston 42, any solids in the first fluid do not cross inner piston seals 80 or outer piston seals 82. Lower seals 86 handle the pressure drop across seal assembly 40 and are lubricated by the second fluid. Solids are prevented from contacting lower seals 86, which are only contacted by the second fluid in chamber 46 (i.e., a clean fluid with no drill cuttings or other particles) because $P_1$ in chamber 46 is greater than $P_2$ in the annular space around housing 12. The pressure differential across plug 44 prevents any cuttings or other solids in the fluid around housing 12 from contacting lower seals 86. In other words, if any fluid moves across lower seals 86, it is the clean lubricating fluid from chamber 46. In this way, all of the seals in seal assembly 40 are protected from solids, such as drill cuttings: inner and outer piston seals 80, 82 because there is no pressure differential across these seals, and lower seals 86 because a clean lubricating fluid is placed on the higher pressure side of this seal.

Each assembly described in this disclosure may include any combination of the described components, features, and/or functions of each of the individual assembly embodiments. Each method described in this disclosure may include any combination of the described steps in any order, including the absence of certain described steps and combinations of steps used in separate embodiments. Any range of numeric values disclosed herein includes any subrange therein. Plurality means two or more.

While preferred embodiments have been described, it is to be understood that the embodiments are illustrative only and that the scope of the invention is to be defined solely by the appended claims when accorded a full range of equivalents, many variations and modifications naturally occurring to those skilled in the art from a review hereof.

We claim:

1. A mud-lubricated bearing section, comprising:
    a housing including a housing central bore defined by a housing inner surface;
    a mandrel partially disposed within the housing central bore, wherein the mandrel includes a mandrel central bore, a mandrel outer surface, and at least one mandrel fluid port extending from the mandrel central bore to the mandrel outer surface;
    at least one mud-lubricated bearing disposed within the housing central bore and around the mandrel outer surface above the mandrel fluid port;
    a piston slidingly disposed within the housing central bore and around the mandrel outer surface below the mandrel fluid port, the piston including an inner piston seal engaging the mandrel outer surface and an outer piston seal engaging the housing inner surface;
    an intermediate annular space between the mandrel outer surface and the housing inner surface, wherein the intermediate annular space is disposed below the at least one mud-lubricated bearing, and wherein the piston defines the lower end of the intermediate annular space;
    a flow path for a first fluid extending through the at least one mud-lubricated bearing, through the intermediate annular space, through the at least one mandrel fluid port, and into the mandrel central bore;
    a lower seal engaging the mandrel outer surface below the piston;
    a chamber between the mandrel outer surface and the housing inner surface and between the piston and the lower seal, wherein the chamber is configured to contain a second fluid; and
    wherein the mud-lubricated bearing section does not include an oil-lubricated radial or thrust bearing.

2. The mud-lubricated bearing section of claim 1, wherein the lower seal is disposed in an inner groove of a plug, wherein the plug includes a passage fluidly connecting the chamber to the lower seal.

3. The mud-lubricated bearing section of claim 2, wherein the piston forces the second fluid in the chamber through the passage to the lower seal in response to a force applied on the piston caused by a pressure differential between the first fluid in the intermediate annular space and a fluid flowing around an outer surface of the housing.

4. The mud-lubricated bearing section of claim 2, wherein the passage is formed of a spiral groove in an inner surface of the plug.

5. The mud-lubricated bearing section of claim 2, wherein the passage is formed of a longitudinal groove in an inner surface of the plug.

6. The mud-lubricated bearing section of claim 2, wherein the mandrel fluid port extends laterally from the mandrel central bore to the mandrel outer surface.

7. The mud-lubricated bearing section of claim 1, wherein the first fluid is a drilling mud and the second fluid is a grease, an oil, or another lubricant.

8. The mud-lubricated bearing section of claim 1, further comprising a housing fluid port extending from an outer surface of the housing to the chamber, wherein the housing fluid port is selectively sealed.

9. The mud-lubricated bearing section of claim 1, wherein the inner piston seal is a rotary seal and the outer piston seal is an axial seal.

10. The mud-lubricated bearing section of claim 1, wherein the piston further includes a second inner piston seal engaging the mandrel outer surface and a second outer piston seal engaging the housing inner surface.

11. The mud-lubricated bearing section of claim 1, wherein the at least one mud-lubricated bearing includes a mud-lubricated radial bearing and a mud-lubricated thrust bearing.

12. A mud-lubricated bearing assembly for a drilling motor, comprising:
- a housing including a housing central bore defined by a housing inner surface;
- an adapter disposed within the housing central bore, wherein an upper end of the adapter is configured for connection to a lower end of a transmission shaft;
- a mandrel secured to a lower end of the adapter, wherein the mandrel is partially disposed within the housing central bore, wherein the mandrel includes a mandrel central bore, a mandrel outer surface, and at least one mandrel fluid port extending from the mandrel central bore to the mandrel outer surface;
- at least one mud-lubricated bearing disposed within the housing central bore and around the mandrel outer surface above the mandrel fluid port;
- a piston slidingly disposed within the housing central bore and around the mandrel outer surface below the mandrel fluid port, the piston including an inner piston seal disposed in an inner groove and an outer piston seal disposed in an outer groove, wherein the inner piston seal engages the mandrel outer surface and the outer piston seal engages the housing inner surface;
- an intermediate annular space between the mandrel outer surface and the housing inner surface, wherein the intermediate annular space is disposed below the at least one mud-lubricated bearing, and wherein the piston defines the lower end of the intermediate annular space;
- a flow path for a first fluid extending through the at least one mud-lubricated bearing, through the intermediate annular space, through the at least one mandrel fluid port, and into the mandrel central bore;
- a plug secured to a lower end of the housing and around the mandrel outer surface, wherein the plug includes at least one lower seal disposed in an inner groove of the plug, wherein the lower seal engages the mandrel outer surface;
- a chamber between the mandrel outer surface and the housing inner surface, wherein a chamber upper end is defined by a lower end of the piston and a chamber lower end is defined by an upper end of the plug, and wherein the chamber is configured to contain a second fluid;
- wherein the mud-lubricated bearing assembly does not include an oil-lubricated radial or thrust bearing.

13. The mud-lubricated bearing assembly of claim 12, wherein the plug further includes a passage fluidly connecting the chamber to the lower seal, wherein the piston forces the second fluid in the chamber through the passage to the lower seal in response to a force applied on the piston caused by a pressure differential between the first fluid in the intermediate annular space and a fluid flowing around an outer surface of the housing.

14. The mud-lubricated bearing assembly of claim 13, wherein the piston further includes a second inner piston seal disposed in a second inner groove and a second outer piston seal disposed in a second outer groove, wherein the second inner piston seal engages the mandrel outer surface and the second outer piston seal engages the housing inner surface.

15. The mud-lubricated bearing assembly of claim 12, further comprising a housing fluid port extending from an outer surface of the housing to the chamber, wherein the housing fluid port is selectively sealed.

16. The mud-lubricated bearing assembly of claim 12, wherein the plug is threadedly connected to the housing.

17. The mud-lubricated bearing assembly of claim 16, wherein the housing is formed of two or more threadedly-connected housing sections.

18. A method of returning a drilling fluid to a mandrel central bore in a mud-lubricated bearing section, comprising the steps of:
- a) providing a mud-lubricated bearing section comprising: a housing including a housing central bore defined by a housing inner surface; a mandrel partially disposed within the housing central bore, wherein the mandrel includes a mandrel central bore, a mandrel outer surface, and at least one mandrel fluid port extending from the mandrel central bore to the mandrel outer surface; at least one mud-lubricated bearing disposed within the housing central bore and around the mandrel outer surface above the mandrel fluid port; a piston slidingly disposed within the housing central bore and around the mandrel outer surface below the mandrel fluid port, the piston including an inner piston seal engaging the mandrel outer surface and an outer piston seal engaging the housing inner surface; an intermediate annular space between the mandrel outer surface and the housing inner surface, wherein the intermediate annular space is disposed below the at least one mud-lubricated bearing, and wherein the piston defines the lower end of the intermediate annular space; a flow path for a first fluid extending through the at least one mud-lubricated bearing, through the intermediate annular space, through the at least one mandrel fluid port, and into the mandrel central bore; a lower seal engaging the mandrel outer surface below the piston; a chamber between the mandrel outer surface and the housing inner surface and between the piston and the lower seal; wherein the mud-lubricated bearing section does not include an oil-lubricated radial or thrust bearing;
- b) filling the chamber with a second fluid, wherein the second fluid is a grease, an oil, or another lubricant;
- c) feeding the first fluid through the flow path through the mud-lubricated bearing, the intermediate annular space, the mandrel fluid port, and into the mandrel fluid port; wherein the piston directs the first fluid in the intermediate annular space into the mandrel central bore through the mandrel fluid port.

19. The method of claim 18, wherein the lower seal is disposed in an inner groove of a plug, wherein the plug includes a passage fluidly connecting the chamber to the lower seal, and wherein the method further comprises the steps of:
- d) using the piston to force the second fluid in the chamber through the passage to the lower seal in response to a force applied on the piston caused by a pressure differential between the first fluid in the intermediate annular space and a fluid flowing around an outer surface of the housing.

20. The method of claim 18, wherein the first fluid is a drilling fluid.

* * * * *